United States Patent
Choi et al.

(10) Patent No.: US 10,309,478 B2
(45) Date of Patent: Jun. 4, 2019

(54) END CAP FOR A PISTON-CYLINDER UNIT

(71) Applicant: ZF FRIEDRICHSHAFEN AG, Friedrchshafen (DE)

(72) Inventors: Younsik Choi, Seongsangu Chongwon-Shi (KR); Yunhyung Kim, Chanwon-Si (KR)

(73) Assignee: ZF Friedrichshafen AG, Friedrichshafen (DE)

( * ) Notice: Subject to any disclaimer, the term of this patent is extended or adjusted under 35 U.S.C. 154(b) by 3 days.

(21) Appl. No.: 15/528,601

(22) PCT Filed: Nov. 3, 2015

(86) PCT No.: PCT/EP2015/075566
§ 371 (c)(1),
(2) Date: May 22, 2017

(87) PCT Pub. No.: WO2016/087151
PCT Pub. Date: Jun. 9, 2016

(65) Prior Publication Data
US 2017/0261062 A1  Sep. 14, 2017

(30) Foreign Application Priority Data
Dec. 2, 2014  (DE) .......... 10 2014 224 636

(51) Int. Cl.
*F16F 9/36*  (2006.01)
*F16F 9/32*  (2006.01)

(52) U.S. Cl.
CPC .......... *F16F 9/36* (2013.01); *F16F 9/32* (2013.01); *F16F 9/3242* (2013.01)

(58) Field of Classification Search
CPC .......... F16F 9/36; F16F 9/32; F16F 9/3242
USPC .......... 188/322.17, 322.16, 322.12
See application file for complete search history.

(56) References Cited

U.S. PATENT DOCUMENTS

| 4,364,457 | A | * | 12/1982 | Wossner | F16F 9/364 188/322.17 |
| 4,828,232 | A | * | 5/1989 | Harrod | F16F 9/084 188/322.12 |
| 5,176,229 | A | * | 1/1993 | Kanari | F16F 9/364 188/315 |
| 6,176,492 | B1 | * | 1/2001 | Sawai | F16F 9/3405 188/322.18 |
| 6,474,216 | B2 | * | 11/2002 | Heinz | F16F 9/38 92/169.1 |

(Continued)

FOREIGN PATENT DOCUMENTS

| DE | 7834927 | 3/1979 |
| DE | 10138196 | 10/2002 |

(Continued)

OTHER PUBLICATIONS

Machine Translation in English for JP 2008-215457A, Inventor: Yatagai; 18 pages, Retrieve Date: Apr. 26, 2018.*

*Primary Examiner* — Thomas J Williams
*Assistant Examiner* — Mariano Sy
(74) *Attorney, Agent, or Firm* — Cozen O'Connor

(57) ABSTRACT

An end cap for a piston-cylinder unit with a base which has a through-opening and carries a seal, wherein at least one discharge channel extends radially proceeding from the seal, and wherein the discharge channel is constructed at the end cap on the inner side with respect to an outer cover surface.

10 Claims, 1 Drawing Sheet

(56) References Cited

U.S. PATENT DOCUMENTS

| | | | |
|---|---|---|---|
| 7,810,619 B2 | 10/2010 | Maeda | |
| 8,991,572 B2 * | 3/2015 | Wang | F16F 9/36 |
| | | | 188/315 |
| 9,022,188 B2 | 5/2015 | Lee | |
| 9,829,062 B2 * | 11/2017 | Tsunekawa | F16F 9/585 |

FOREIGN PATENT DOCUMENTS

| | | | |
|---|---|---|---|
| JP | 2008215457 A * | 9/2008 | |
| JP | 2009222223 | 10/2009 | |

* cited by examiner

US 10,309,478 B2

END CAP FOR A PISTON-CYLINDER UNIT

PRIORITY CLAIM

This is a U.S. national stage of application No. PCT/EP2015/075566, filed on Nov. 3, 2015. Priority is claimed on the following application(s): Country: Germany, Application No.: 10 2014 224 636.9, filed: Dec. 2, 2014; the content of which is/are incorporated in its entirety herein by reference.

FIELD OF THE INVENTION

The present invention is directed to an end cap for a piston-cylinder unit having at least one discharge channel.

BACKGROUND OF THE INVENTION

An end cap for a vibration damper is known from U.S. Pat. No. 9,022,188. This end cap has a seal which is fastened in the cap. Dirt is removed through a plurality of radial channels in an outer cover side with respect to an end face of the vibration damper.

However, as a result of the shape of the radial discharge channels, there is an annular channel between a base of the seal and a through-hole. The base of the annular channel is situated lower than the groove base of the discharge channels. As a result, dirt collects in the annular channel and can come into the contact region where the seal contacts an axially moveable bar.

It is thus an object of the present invention to minimize the dirt problem known from the prior art.

SUMMARY OF THE INVENTION

According to the invention, this object is met in that the discharge channel is constructed at the end cap on the inner side with respect to an outer cover surface and with respect to the fastening portion.

In contrast to the prior art, no dirt can become deposited between the seal and the end cap because this dirt can flow past the seal on the outside.

It can be provided that a channel base of the discharge channel is constructed so as to be lower in discharge direction than a socket of the seal. This ensures that no dirt can collect at a sealing lip of the seal and consequently impair the operation of the seal.

In one embodiment form, the at least one discharge channel is constructed as open groove at an underside of the end cap. The open groove leads to a generally short flow-off channel which, owing to its construction, cannot become clogged or be restricted in cross section.

Preferably the open groove adjoins an axial groove in a fastening portion of the end cap also contributes to this.

Alternatively or in conjunction, the at least one discharge channel is constructed as a tube inside the wall of the base.

The construction of the seal is simplified in that the seal is held at the end cap by a fastening ring which is separate from the seal.

BRIEF DESCRIPTION OF THE DRAWINGS

The invention will be described in more detail with reference to the drawings in which.

DETAILED DESCRIPTION OF THE PRESENTLY PREFERRED EMBODIMENTS

Figure 1:
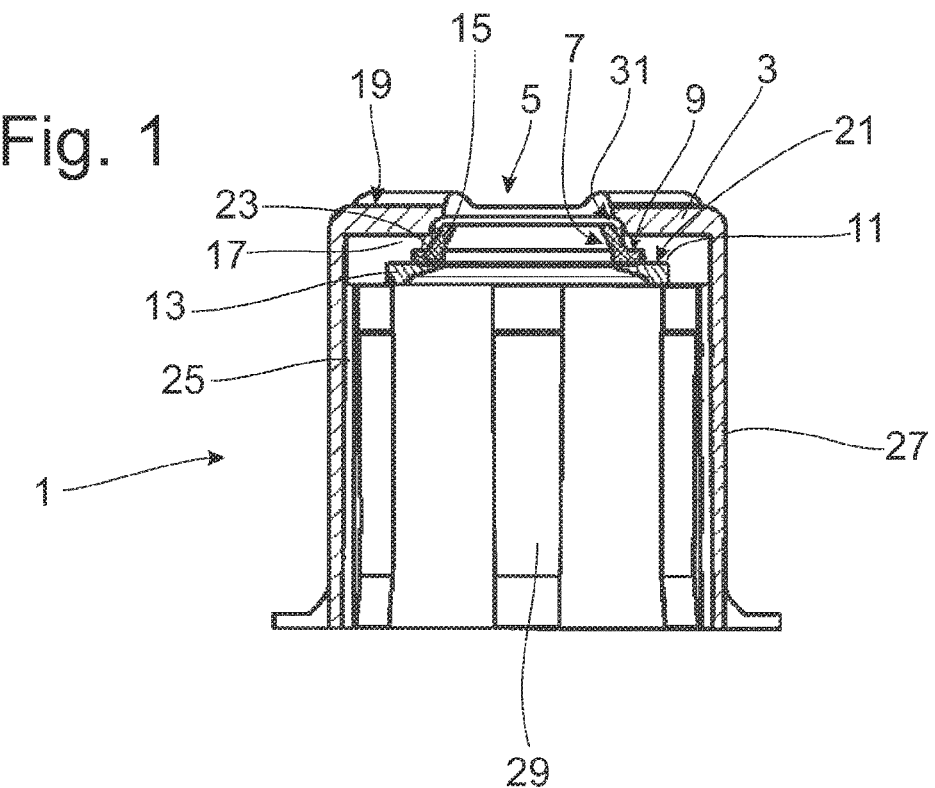
FIG. 1 is a cross-sectional view of an end cap with radial grooves as discharge channel.

FIG. 1 shows an end cap 1 for a piston-cylinder unit in the constructional form of a vibration damper, for example. The end cap 1 has a base 3 with a through-opening 5 for a piston rod, not shown, of the piston-cylinder unit. The base 3 of the end cap 1 carries a seal 7 in the area of the through-opening 5, which seal 7 contacts the above-mentioned piston rod. The through-opening 5 is constructed in a stepped manner in the area of the base 3 and supports the annular seal 7 at a step 9. A fastening ring 13 is pressed in a further step 11 so that the seal 7 is axially fixed between the step 9 and the fastening ring 13. The seal is guided radially by the above-mentioned step.

Alternatively, the seal 7 could also be clamped simply by an interference fit with the through-opening 5 so that a fastening ring 13 can be dispensed with.

The piston-cylinder unit is often exposed to external influences and, therefore, to dirt and moisture. To keep dirt particles away from the seal 7, particularly a sealing lip 15, the end cap 1 has at least one discharge channel 17 which is constructed at the end cap 1 on the inner side with respect to an outer cover surface 19 and the fastening portion 27. Accordingly, "on the inner side" means that an axial distance formed by a portion of the wall of the base 3 exists between the discharge channel 17 and the cover side 19.

The outer cover surface 19 is often used as stop surface for a stop buffer and extends circularly along an end of the piston-cylinder unit.

FIG. 1 shows a constructional variant in which the discharge channel 17 is constructed as an open groove. A channel base 21 or a groove base of the discharge channel is constructed so as to be lower in discharge direction than a socket 23 of the seal 7. The socket 23 of the seal 7 is the area of the seal 7 that serves to fasten the seal 7, i.e., no sealing function is carried out with respect to the piston rod surface.

At least one axial groove 25 in a fastening portion 27 of the end cap 1 adjoins the discharge channel 17 or open grooves. The end cap 1 is centered radially with respect to the piston-cylinder unit via the fastening portion 27. Inner clamping surfaces 29 at the fastening portion 27 form an interference fit with the piston-cylinder unit, which interference fit counteracts an axial withdrawing movement of the end cap from the piston-cylinder unit.

Dirt can enter the through-opening 5. An annular gap 31 between a sealing lip 15 and the base 3 allows the dirt to arrive in the discharge channels 17. The channel base 21 is lower than the sealing lip 15 so that dirt cannot collect between the sealing lip 15 and the through-opening 5 but rather is moved in direction of the discharge channels 17. The discharge movement already results solely from the installed position of the end cap 1 in which the annular gap 31 is supported higher than the channel base 21. This discharge movement of the dirt continues to travel into the axial grooves 25 so that no dirt can settle on the sealing lip 15.

Figure 2:
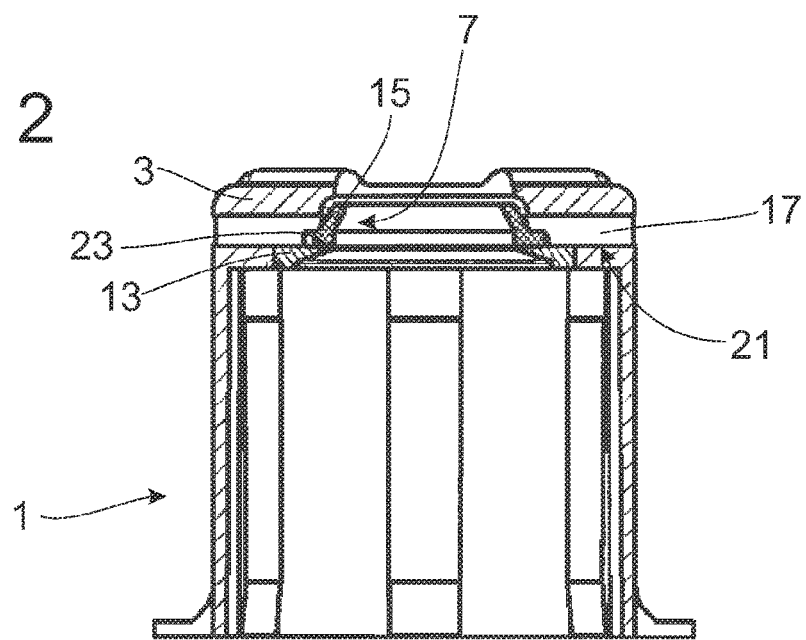
FIG. 2 is a cross-sectional view of an end cap with radial tubes.

The variant according to FIG. 2 shows an end cap 1 having an arrangement of the seal 7 identical to that shown in FIG. 1. The difference is that the at least one discharge channel 17 is constructed as a tube within the wall of the base 3. It can also be seen in this case that the dirt is guided past the sealing lip 15 into the lower channel base 21, i.e., is not deposited in the area of the sealing lip 15.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An end cap for a for a piston-cylinder unit comprising:
    a fastening portion;
    a base having a through-opening and an inner side opposite an outer cover surface;
    a seal carried by the base of the end cap;
    at least one discharge channel extending radially proceeding from the seal, the at least one discharge channel constructed at the end cap on the inner side with respect to the outer cover surface and with respect to the fastening portion.

2. The end cap according to claim 1, wherein the seal comprises a socket and the at least one discharge channel comprises a channel base constructed so as to be lower in a discharge direction than the socket of the seal.

3. The end cap according to claim 2, additionally comprising a fastening ring separate from the seal and wherein the seal is held at the end cap by the fastening ring.

4. The end cap according to claim 1, wherein the at least one discharge channel is constructed as an open groove at the inner side of the end cap.

5. The end cap according to claim 4, additionally comprising an axial groove in the fastening portion of the end cap, and wherein the open groove adjoins the axial groove.

6. The end cap according to claim 5, additionally comprising a fastening ring separate from the seal and wherein the seal is held at the end cap by the fastening ring.

7. The end cap according to claim 4, additionally comprising a fastening ring separate from the seal and wherein the seal is held at the end cap by the fastening ring.

8. The end cap according to claim 1, wherein the base comprises a wall and wherein the at least one discharge channel is constructed as a tube inside the wall.

9. The end cap according to claim 8, additionally comprising a fastening ring separate from the seal and wherein the seal is held at the end cap by the fastening ring.

10. The end cap according to claim 1, additionally comprising a fastening ring separate from the seal and wherein the seal is held at the end cap by the fastening ring.

* * * * *